United States Patent [19]

Carter, Jr.

[11] 3,832,439

[45] Aug. 27, 1974

[54] METHOD FOR THE SUPPRESSION OF HYDROGEN DURING THE DISSOLUTION OF ZIRCONIUM AND ZIRCONIUM ALLOYS

[75] Inventor: Daniel G. Carter, Jr., Richland, Wash.

[73] Assignee: The United States of America as represented by the United States Atomic Energy Commission, Washington, D.C.

[22] Filed: Jan. 10, 1973

[21] Appl. No.: 322,565

[52] U.S. Cl.................. 423/4, 23/312 ME, 75/103, 252/301.1 R, 423/81, 423/82
[51] Int. Cl............................................ C01g 56/00
[58] Field of Search.............. 423/4, 81, 82; 75/103; 23/312 ME; 252/301.1 R

[56] References Cited
UNITED STATES PATENTS

| | | | |
|---|---|---|---|
| 2,992,067 | 7/1961 | Swanson | 423/4 |
| 2,992,886 | 7/1961 | Gens | 423/4 |
| 3,007,769 | 11/1961 | McCord et al. | 423/4 |
| 3,102,849 | 9/1963 | Vander Wall et al. | 423/4 |
| 3,294,492 | 12/1966 | Bartlett et al. | 423/4 |
| 3,341,304 | 9/1967 | Newby | 423/4 |

OTHER PUBLICATIONS

Swanson – The Selective Dissolution of Zirconium or Zircaloy Cladding by the Zirflex Process, Proceedings of the Second UN International Conf. on the Peaceful Uses of Atomic Energy, Vol. 17, pp. 154–158, 1958.

*Primary Examiner*—Carl D. Quarforth
*Assistant Examiner*—R. E. Schafer
*Attorney, Agent, or Firm*—John A. Horan; Arthur A. Churm; James W. Weinberger

[57] ABSTRACT

The evolution of hydrogen during dissolution of zirconium and zirconium alloys in an ammonium fluoride and ammonium nitrate solution (Zirflex Process) is suppressed by the presence of copper in the solution, while the rate at which the zirconium is dissolved is improved by the addition of sodium nitrite.

4 Claims, No Drawings

METHOD FOR THE SUPPRESSION OF HYDROGEN DURING THE DISSOLUTION OF ZIRCONIUM AND ZIRCONIUM ALLOYS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method for suppressing the evolution of hydrogen. More specifically, this invention relates to a method for suppressing the evolution of hydrogen during dissolution of zirconium and zirconium alloys in an ammonium fluoride and ammonium nitrate solution while maintaining or increasing the rate of metal dissolution.

For safety and for the protection of nuclear reactor fuel elements, they must be encased or clad in a protective jacket of metal such as zirconium, aluminum or stainless steel. Once the reactor fuel has been irradiated in a nuclear reactor, it must be reprocessed to recover and decontaminate fissionable and/or fertile materials contained therein. However, in order to reprocess the irradiated fuel, the jacket or cladding must first be removed safely and economically.

One such process for the removal of zirconium and zirconium alloys such as zircaloy from fuel elements is known as the Zirflex Process and is described in a paper by J. L. Swanson in Volume 17 of the Second International Conference on the Peaceful Uses of Atomic Energy, pages 154 to 161. In this process, the zirconium cladding is dissolved in a boiling solution of about 5.5 M ammonium fluoride and 0.5 M ammonium nitrate. Although the process is effective, it results in the evolution of significant quantities of hydrogen gas which is a potential explosion hazard.

Several methods have been tried to maintain the hydrogen concentration at a safe level, such as, for example: slowly adding the Zirflex stock solution to a dissolver charge over a period of several hours; slowly adding a concentrated Zirflex solution to a dissolver charge covered with boiling water; adding the fuel element charge to cold Zirflex solution; and adding concentrated Zirflex solution to a dissolver charge covered with boiling ammonium nitrate. None of the above methods has proved usable since either the $H_2/Zr$ mole ratio was higher than normal or the time required for dissolution was too long to be economically feasible, since time lost here will slow down the entire fuel reprocessing cycle.

SUMMARY OF THE INVENTION

It has been known that the addition of small amounts of copper to the Zirflex solution will inhibit corrosion for various types of stainless steel by as much as 70 percent. I have discovered that the addition of copper to the Zirflex solution will reduce the $H_2/Zr$ mole ratio by a factor of about 0.127. I have also found that, when both copper and sodium nitrite are added to the Zirflex solution, an increase of about 30 percent in the dissolution rate of zirconium and zirconium alloys is obtained, while the $H_2/Zr$ mole ratio is still reduced by a significant factor. In addition, it has been found that the addition of copper to the Zirflex solution results in about a 19 percent reduction in the rate of dissolution of uranium, thereby decreasing the loss of the uranium fuel to the decladding solution.

It is therefore one object of this invention to provide a method of suppressing the evolution of hydrogen gas.

It is a further object of this invention to provide a method of suppressing the evolution of hydrogen while dissolving zirconium and zirconium alloys in a solution of ammonium fluoride and ammonium nitrate.

Finally, it is the object of this invention to provide a method of suppressing the evolution of hydrogen while dissolving zirconium or zirconium alloys in a solution of ammonium fluoride and ammonium nitrate while maintaining or improving the rate at which the zirconium metal is dissolved.

DESCRIPTION OF THE PREFERRED EMBODIMENT

These and other objects of the invention may be met by preparing a dissolver solution of ammonium fluoride and ammonium nitrate, adding sufficient copper to the solution to make the solution 0.04 to 0.25 M in copper, heating the solution to boiling and contacting the boiling solution with zirconium and zirconium alloy whereby the zirconium and zirconium alloy are dissolved in the solution while the hydrogen evolved is reduced. By also making the dissolver solution from about 0.04 to about 0.10 M in sodium nitrite, the rate of dissolution of the zirconium and zirconium alloy can be increased.

The decladding solution may generally be about 5.5 M in ammonium fluoride and about 0.5 M in ammonium nitrate, although these concentrations may normally vary within a limited range.

The copper may be added to the decladding solution as either $Cu(NO_3)_2$ or as fine copper grindings without affecting the hydrogen suppression results.

The invention can best be further described and understood by reference to the following example and table.

EXAMPLE

Hydrogen evolution and dissolution rates were determined using a 1.2-liter Teflon-lined stainless steel beaker fitted with a Teflon lid to form the dissolver. A stainless steel thermometer, stainless steel insert for the nitrogen sparge, and a Pyrex ground glass filter for the condenser were each inserted through the Teflon lid. A micrometer needle valve was inserted in the nitrogen line between the pressure-reducing gage and the sparge line tube to control gas flow.

A series of experiments utilizing the above-described apparatus were run under various conditions to demonstrate the effectiveness of the present invention. Oxide-free Zircaloy which is a zirconium alloy containing minor amounts of tin, iron, chromium and nickel discs 3.36 cm in diameter were suspended in a Teflon-lined 1.2-liter stainless steel dissolver containing about 250 ml of a dissolver solution having varying concentrations at a temperature of 103° C. ± 3°. A flow of nitrogen gas was used to remove the hydrogen which was evolved during the experiments.

DISSOLUTION RATE, H₂/Zr MOLE RATIO AND TERMINAL ZIRCONIUM
CONCENTRATION
AS A FUNCTION OF DISSOLVER SOLUTION COMPOSITION

| $NH_4F$ M | $NH_4NO_3$ M | $NaNO_2$ M | $Cu(NO_3)_2$ M | Cu M | Contact Time (min) | Rate (mg/min cm²) | $H_2/Zr$ |
|---|---|---|---|---|---|---|---|
| 5.5 | 0.5 | — | — | — | 38.0 | 19.3 | 0.08 |
| 5.5 | 0.5 | — | — | — | 35.0 | 19.1 | 0.11 |
| 5.5 | 0.5 | — | — | — | 25.0 | 22.8 | 0.11 |
| 5.5 | 0.5 | — | — | — | 25.0 | 21.3 | 0.11 |
| 5.5 | 0.5 | — | — | — | 20.0 | 26.5 | 0.09 |
| 5.5 | 0.5 | — | — | — | 20.0 | 25.2 | 0.09 |
| 5.5 | 0.5 | — | — | 0.04 | 36.5 | 17.0 | 0.02 |
| 5.5 | 0.5 | — | — | 0.04 | 36.0 | 18.4 | 0.02 |
| 5.5 | 0.5 | — | — | 0.04 | 36.0 | 15.9 | 0.02 |
| 5.5 | 0.5 | — | — | 0.04 | 32.3 | 16.5 | 0.01 |
| 5.5 | 0.25 | — | 0.125 | — | 36.0 | 17.6 | 0.02 |
| 5.5 | — | — | 0.25 | — | 36.0 | 18.0 | 0.03 |
| 5.5 | — | — | 0.125 | — | 36.0 | 17.0 | 0.62 |
| 5.5 | 0.5 | — | 0.02 | — | 37.0 | 18.3 | 0.03 |
| 7.0 | 0.25 | — | 0.125 | — | 36.0 | 18.2 | 0.03 |
| 5.5 | 0.38 | — | — | — | 36.5 | 16.7 | 0.05 |
| 5.5 | 0.38 | — | — | — | 36.0 | 19.8 | 0.12 |
| 5.5 | 0.5 | 0.04 | — | — | 36.5 | 23.7 | 0.11 |
| 5.5 | 0.5 | 0.08 | — | — | 36.5 | 24.4 | 0.10 |
| 5.5 | 0.5 | 0.10 | — | — | 32.0 | 26.6 | 0.10 |
| 5.5 | 0.5 | 0.10 | — | 0.04 | 35.5 | 23.1 | 0.02 |
| 5.5$_a$ | 0.5 | 0.04 | — | 0.04 | 36.0 | 17.6 | 0.02 |
| 5.5$_b$ | 0.5 | — | — | — | 44.0 | 11.3 | 0.14 |
| 5.5$_b$ | 0.5 | — | — | 0.04 | 36.0 | 15.9 | 0.01 |
| 5.5$_c$ | 0.5 | — | — | 0.04 | 36.0 | 17.6 | 0.02 |
| 5.5$_d$ | 0.5 | — | — | — | 46.5 | 12.7 | 0.14 |
| 5.5$_e$ | 0.5 | — | — | — | 35.5 | 12.7 | 0.21 |
| 5.5$_e$ | 0.5 | — | — | — | 35.5 | 15.2 | 0.13 | a. 250 ml 11.0 M NH₄F added to 250 ml boiling 1.0 M NH₄NO₃ at a constant rate.
b. Stainless steel dissolver.
c. Zircaloy disc loaded into dissolver with Zirflex solution.
d. 250 ml 11.0 M NH₄F-1.0 M NH₄NO₃ added to 250 ml boiling water.
e. 250 ml 11.0 M NH₄F-1.0 M NH₄NO₃ added to 250 ml boiling 0.4 M NH₄NO₃.

As can be seen by the results in the above table, the addition of copper to the Zirflex solution brought about a significant reduction in the H₂/Zr mole ratio. It can also be seen that the addition of sodium nitrite to the Zirflex solution containing the copper substantially increased the dissolution rate of the zirconium-containing alloy.

It will be understood that the invention is not to be limited by the details given herein but may be modified within the scope of the appended claims.

The embodiments of the invention in which an exclusive property or privilege is claimed are defined as follows:

1. A method for increasing the rate of dissolving zirconium and zirconium alloys containing minor amounts of tin, iron, chromium and nickel while suppressing the evolution of hydrogen thereby comprising: preparing a dissolver solution of ammonium fluoride and ammonium nitrate; adding sufficient copper to make the solution 0.04 to 0.25 M in copper, making the solution from about 0.04 to 0.10 M in sodium nitrate, heating the solution to boiling, and contacting the boiling solution with zirconium and zirconium alloy whereby the rate at which the zirconium and zirconium alloy are dissolved in the solution is increased while the evolution of hydrogen is suppressed.

2. The method of claim 1 wherein the dissolver is about 5.5 M in ammonium fluoride and about 0.5 M in ammonium nitrate.

3. In the method for decladding zirconium and zirconium alloy-clad nuclear reactor fuel elements, when said alloy contains minor amounts of tin, iron, chromium and nickel, by contacting the fuel element with a boiling solution of ammonium fluoride and ammonium nitrate whereby the zirconium and zirconium alloy are dissolved in the solution and hydrogen gas is evolved, the improvement comprising: making the boiling solution from about 0.04 to about 0.25 M in copper and about 0.04 to about 0.10 M in sodium nitrate whereby the evolution of hydrogen is suppressed while the rate of dissolution of the zirconium and zirconium alloy is increased.

4. The method of claim 3 whereby the boiling solution is about 5.5 M in ammonium fluoride and about 0.5 M in ammonium nitrate.

* * * * *